United States Patent [19]
Kaneko et al.

[11] Patent Number: 5,890,396
[45] Date of Patent: Apr. 6, 1999

[54] ARM MECHANISM WITH INDEPENDENT CONTROL OF POSITION AND ORIENTATION

[75] Inventors: Kenji Kaneko; Hiroki Tokashiki; Kazuo Tanie, all of Tsukuba, Japan

[73] Assignee: Agency of Industrial Science & Technology, Ministry of International Trade & Industry, Tokyo, Japan

[21] Appl. No.: 961,861

[22] Filed: Oct. 31, 1997

[30] Foreign Application Priority Data

Oct. 31, 1996 [JP] Japan .................................. 8-306013

[51] Int. Cl.⁶ .................................................. B25J 18/00
[52] U.S. Cl. ................................... 74/490.01; 74/490.03; 378/196; 414/917; 901/19; 901/23; 901/41
[58] Field of Search ........................... 74/490.01, 490.03; 378/196; 414/917; 901/19, 23, 41

[56] References Cited

U.S. PATENT DOCUMENTS

| | | | |
|---|---|---|---|
| 5,014,292 | 5/1991 | Siczek et al. | 378/196 |
| 5,050,204 | 9/1991 | Siczek et al. | 378/197 |
| 5,386,453 | 1/1995 | Harrawood et al. | 378/196 |
| 5,397,323 | 3/1995 | Taylor et al. | 901/41 X |
| 5,410,584 | 4/1995 | Schaefer et al. | 378/196 |

OTHER PUBLICATIONS

Ken Masamune, et al., "Robotics for Less Invasive Surgery," Collected Papers (V) of the 73$^{rd}$ General Meeting of the Japan Society of Mechanical Engineers, (1996), pp. 150–151. (with English Abstract).

Mamoru Mitsuishi, et al., "Development of an Inter–World Tele–Micro–Surgery System with Operational Environment Information Transmission Capability," 1995 IEEE International Conference on Robotics and Automation, vol. 3, (1995), pp. 3081–3088.

Koichi Koyano, et al., "Micro Object Handling by a Manipulation System with Concentrated Visual Fields," Robotics and Mechatronics Lectures of the Japan Society of Mechanical Engineers, vol. B, (1995), pp. 1386–1389. (with English Abstract).

*Primary Examiner*—Allan D. Herrman
*Attorney, Agent, or Firm*—Oblon, Spivak, McClelland, Maier & Neustadt, P.C.

[57] ABSTRACT

An arm mechanism includes a drive control mechanism that uses an end effector coordinate system and has an end effector drive control mechanism. The drive control mechanism includes an end effector rotational drive control mechanism and an end effector coordinate system translational drive control mechanism. The rotational drive control mechanism has three rotational actuators for driving end effector rotation about each axis separately. The end effector coordinate system translational drive control mechanism has an end effector coordinate system translational actuator to drive translational motion of the object. The drive control mechanism further includes an orientation maintenance mechanism that maintains the orientation of the target object on the absolute coordinate system and two absolute coordinate system translational actuators supported on the orientation maintenance mechanism for providing translational motion of the object along two orthogonal axes on the absolute coordinate system.

6 Claims, 8 Drawing Sheets

ARM MECHANISM WITH INDEPENDENT CONTROL OF POSITION AND ORIENTATION

BACKGROUND OF THE INVENTION

1. Field of the Invention

The present invention relates to an arm mechanism in which translational motion for controlling position and rotational motion for controlling orientation are independently controlled. The arm mechanism of this invention can be applied to manipulators for manipulating cells and other fine operations, manipulators used in micro-assembly and other such manipulators.

2. Description of the Prior Art

The position and orientation of an end effector of a manipulator have to be controlled in order to manipulate an object with the end effector. In a conventional manipulator an end effector tip is provided on the end of an arm which has a serial link mechanism comprising a plurality of joints and link members extending from a base to the tip. The entire arm is driven to effect translational and rotational motions to set the position and orientation of the end effector. In this type of manipulator arrangement, there is interference between the end effector translational and rotational motions. Namely, changing the orientation of the end effector by rotating the end effector around one of the three axes of the orientation coordinate system affects the orientations (not to be changed) around the remaining two axes and the positions of the three axes of the rotation coordinate system. Similarly, changing the position of the end effector by translational motion of the end effector along one of the three axes of the position coordinate system affects the orientations around the three axes of the orientation coordinate system and the positions (not to be chagned) of the remaining two axes. This interference between translational and rotational motions reduces the accuracy of the end effector tip positioning and generated force. This has given rise to a demand for an arm mechanism that has independent control of position and orientation with no interference between translational and rotational motions.

Conventional arm mechanisms with independent control of position and orientation that have been devised include (1) a rotational arm mechanism that combines an absolute coordinate arm translational mechanism and a gimbal mechanism (pp 150–151 of the Collected Papers (V) of the 73rd General Meeting of the Japan Society of Mechanical Engineers (1996)); (2) a rotational arm mechanism that combines an absolute coordinate arm translational mechanism and a pantograph mechanism (Proc. of 1995 IEEE Int. Conf. on Robotics and Automation, Vol. 3, pp 3081–3088, (1995)); and (3) a mechanism that combines an absolute coordinate arm translational mechanism, a mechanism for rotating the arm without moving the tip, and a table translational and rotational mechanism (Robotics and Mechatronics Lectures of the Japan Society of Mechanical Engineers, Vol. B, pp 1386–1389, (1995)).

However, with the coordinate systems of these technologies being absolute coordinate systems, it is not always easy for an operator to ascertain the position and/or orientation of a target object or an end effector, making it difficult to achieve improvements in task efficiency and accuracy. In tasks such as the task of inserting a needle or rod in a hole, task efficiency and accuracy could be improved by using an end effector arrangement that enables coordinate systems to be established on the end effector that is always axially oriented toward the target point P on the object. However, since conventional manipulators are based on an absolute coordinate system, as described above, changing end effector orientation generates absolute coordinate system motion that differs from the end effector coordinate system motion required for the task, thwarting any improvement in task efficiency and accuracy.

A principal object of the present invention is to provide an arm mechanism with improved task efficiency and accuracy that offers improved accuracy of end effector tip positioning and generated force and facilitates operator comprehension of the position and orientation of a target object and the end effector.

Another object of the present invention is to provide an arm mechanism with improved task efficiency and accuracy that can maintain an end effector at a prescribed target point on an object.

SUMMARY OF THE INVENTION

To accomplish these objects, the present invention provides an arm mechanism with independent control of position and orientation, comprising a drive control mechanism for controlling orientation and relative position of an end effector of a robot arm to perform an operation on a target object, the drive control mechanism having an absolute coordinate system and an end effector coordinate system that locates an origin thereof at a point on the end effector, and including an end effector drive control mechanism that supports the end effector and controls orientation and relative position of the end effector on the end effector coordinate system, the end effector drive control mechanism including a rotational drive control mechanism that controls rotational motion of the end effector and an end effector coordinate system translational drive control mechanism that controls translational motion of the target object and is connected with the rotational drive control mechanism, the rotational drive control mechanism including three rotational actuators for rotating the end effector about each axis of the end effector coordinate system, the end effector coordinate system translational drive control mechanism including an end effector coordinate system translational actuator that effects translational motion of the target object along an end effector center axis direction of the end effector coordinate system, the drive control mechanism further including an orientation maintenance mechanism that is connected to the end effector coordinate system translational drive control mechanism and maintains a fixed orientation of the target object on the absolute coordinate system and two absolute coordinate system translational actuators supported on the orientation maintenance mechanism, the absolute coordinate system translational actuators effecting translational motion of the target object along two orthogonal axes on the absolute coordinate system.

The arm mechanism according to the present invention also comprises inclusion of a translational drive control mechanism for controlling translational motion of the target object in place of the above end effector coordinate system translational drive control mechanism, with the translational drive control mechanism being provided with three translational actuators for driving the object along the direction of each axis of the end effector coordinate system.

As described above, in the arm mechanism according to this invention, rotational motions for controlling the orientation of the end effector are achieved using three rotational actuators. Also, translational motion for positioning the end effector is realized through relative displacement effected by using one translational actuator to drive the table. The motion of the translational actuator therefore does not interfere with other translational or rotational motions, and the motion of one rotational actuator does not interfere with other rotational or translational motions. This enables the precision of end effector tip positioning and generated force to be improved without any interference between translational and rotational motions of the end effector. With the arm mechanism of the first embodiment, the end effector can be maintained with the tip thereof pointed at a target point on a work object, resulting in improved task efficiency and accuracy. Also, the arm mechanism according to the second embodiment has an end effector coordinate system the origin of which is a point on the end effector, making it easier for an operator to ascertain the position and/or orientation of the end effector, which also enables task efficiency and accuracy to be improved.

Further features of the invention, its nature and various advantages will be more apparent from the accompanying drawings and following detailed description of the invention.

DESCRIPTION OF THE PREFERRED EMBODIMENT

FIGS. 1 to 9 show a first embodiment of the arm mechanism with independent control of position and orientation according to the present invention.

Figure 1:
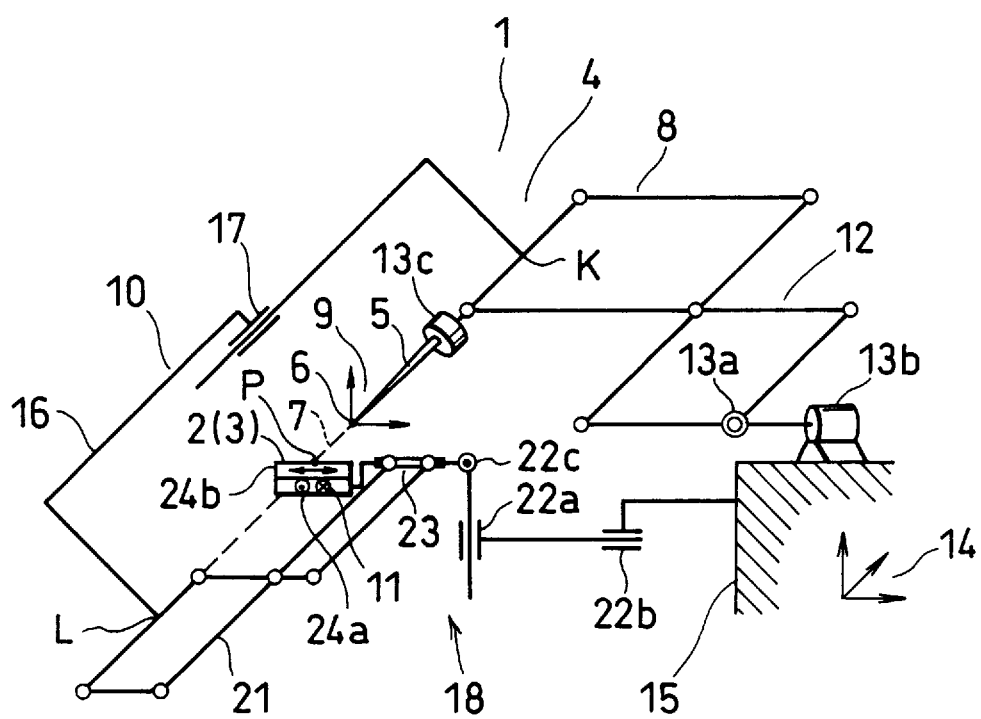
FIG. 1 is a diagram of an arm mechanism with independent control of position and orientation according to a first embodiment of the present invention.

With reference to FIG. 1, reference numeral 1 denotes a drive control mechanism for controlling orientation and relative position of an end effector 5 of a robot arm 4 used to perform an operation on a target object 3 on a table 2. The drive control mechanism 1 uses a coordinate system (in this description, referred to as an end effector coordinate system 9) that locates its origin on the end effector 5 and an absolute coordinate system 14 on the base 15 to control the orientation and relative position of the tip 6 of the end effector 5. The end effector coordinate system 9 is, for example, an orthogonal coordinate system. While there is no particular limitation on the location of the origin of the coordinate system, in the case of this embodiment, to simplify the mechanism, the origin of the end effector coordinate system 9 is located at the end (tip 6) of the end effector. Similarly, while there is no particular limitation on the orientation of the coordinate axis of the end effector coordinate system 9, in the case of this embodiment, to simplify the mechanism the axis is arranged to coincide with the central axis 7 of the end effector 5.

The drive control mechanism 1 includes a rotational drive control mechanism 8 for controlling the rotational motion of the end effector 5, an end effector coordinate system translational drive control mechanism 10 for controlling the translational motion of the object 3, and an absolute coordinate system translational drive control mechanism 11. The rotational drive control mechanism 8 and end effector coordinate system translational drive control mechanism 10 are connected at point K. No relative displacement arises between point K and the origin of the end effector coordinate system 9.

The rotational drive control mechanism 8 is provided with a rotary link mechanism 12 and rotational actuators 13a, 13b and 13c. The rotary link mechanism 12 supports the end effector 5 with respect to the base 15 fixed on the absolute coordinate system 14, and the rotational actuators 13a, 13b and 13c rotate the end effector 5 about each axis of the end effector coordinate system 9. More specifically, rotary actuator 13a effects rotation around the x axis of the end effector coordinate system, rotary actuator 13b effects rotation around the y axis, and rotary actuator 13c effects rotation around the z axis. Since in this embodiment the end effector 5 is shown as a needle that is axially symmetrical along the z axis, rotating the end effector about the z axis does not change the orientation of the needle. However, if the end effector is something having a non-symmetrical shape along the z axis, such as a knife, for example, rotation about the z axis will change the orientation thereof.

The end effector coordinate system translational drive control mechanism 10 has a link 16, and an end effector coordinate system translational actuator 17 that allows relative translational motion parallel to the central axis 7 of the end effector. The front end of the link 16 is connected to an orientation maintenance mechanism 18 at point L, and the absolute coordinate system translational drive control mechanism 11 is connected to the front end of the orientation maintenance mechanism 18, and the table 2 is supported on the absolute coordinate system translational drive control mechanism 11. Consequently, movement of point L is transmitted to the absolute coordinate system translational drive control mechanism 11, producing relative translational motion of the table 2 along the axis 7 for positioning of the end effector 5 relative to the object 3 on the end effector coordinate system 9. In order to control the orientation of the end effector 5 it is necessary to fix the orientation of the object 3. That is, it is necessary for a horizontal orientation to be maintained even when translational movement of the table 2 is effected. The function of the orientation maintenance mechanism 18 is therefore to maintain the orientation while allowing translational motion of the table 2.

For this, the orientation maintenance mechanism 18 is provided with a pantograph mechanism 21, translational sliders 22a, 22b and 22c and a rotational slider 23. The pantograph mechanism 21 transmits motion of the absolute coordinate system translational drive control mechanism 11 to the table 2, and the translational sliders 22a, 22b and 22c and rotational slider 23 support the table 2 on the fixed base 15 and maintain the fixed orientation of the object 3 with respect to the absolute coordinate system 14. The translational sliders 22a, 22b and 22c allow translational motion along the three orthogonal axes of the absolute coordinate system 14, while the rotational slider 23 allows rotation about a horizontal coordinate axis other than the central axis 7 of the end effector coordinate system 9. Absolute coordinate system translational actuators 24a and 24b are supported on the orientation maintenance mechanism 18. The absolute coordinate system translational actuator 24a effects translational motion along one of two orthogonal axes on the absolute coordinate system of the object 3, and the actuator 24b effects translational motion along the other axis.

The operation of the drive control mechanisms thus configured will now be described.

Arm mechanism with independent control of position and orientation (1) Rotational motion of the end effector 5 is always about the tip of the end effector as center (the center of rotation).

(2) Translational motions of the end effector 5 are achieved by motion of a single actuator.

(3) The motion of one translational actuator does not interfere with other translational or rotational motions.

(4) The motion of one rotational actuator does not interfere with other rotational or translational motions.

(5) End effector 5 is always oriented toward target point P.

Mechanism for maintaining table 2 horizontal

The following sliders slide passively, that is, undriven, to maintain the horizontal state of the table 2.

(1) When the rotary actuator 13a is operated, translational slider 22a, translational slider 22b and translational slider 22c;

(2) When the rotary actuator 13b is operated, translational slider 22a, translational slider 22c and rotational slider 23; and (3) When the end effector coordinate system translational actuator 17 is operated, translational slider 22a, translational slider 22b and translational slider 22c.

Even if the absolute coordinate system translational actuator 24a and absolute coordinate system translational actuator 24b are operated, the horizontal state of the table is maintained, so the sliders are not involved.

Figure 2:
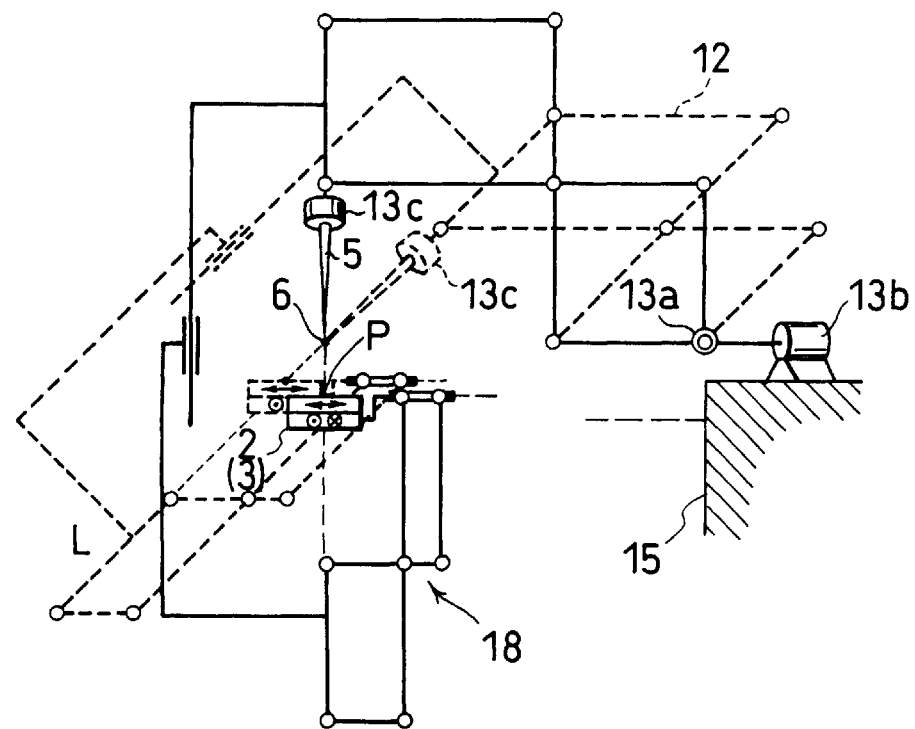
FIG. 2 is a diagram illustrating movement of the robot arm when a rotational actuator of the arm mechanism of FIG. 1 is rotated 45 degrees.
Figure 3:
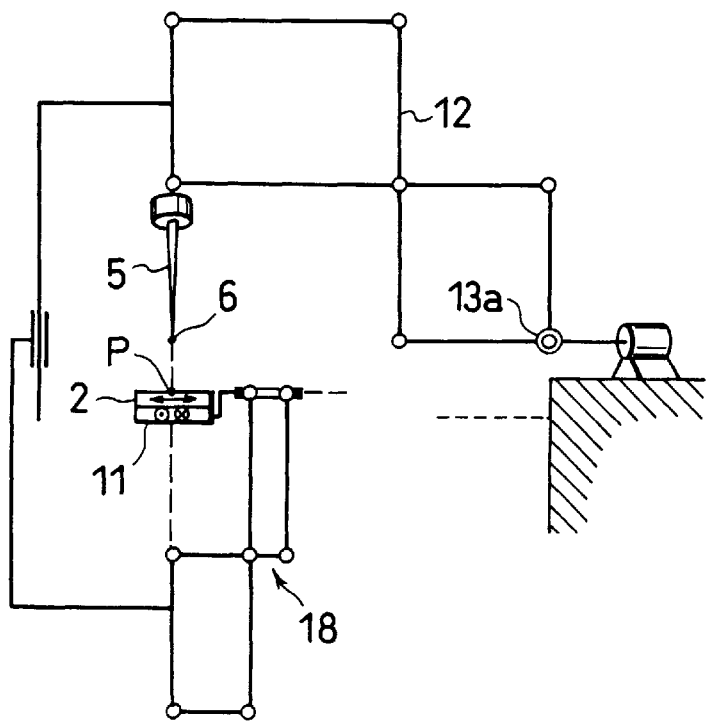
FIG. 3 is a diagram showing the state of the robot arm on completion of the 45-degree rotation of the rotational actuator.

Principle and motion of 45-degree rotation (1) Rotary actuator 13a rotates 45 degrees (FIG. 2). Sliders 22a, 22b and 22c are not shown in FIGS. 2 to 9.

(2) 45-degree rotation about the tip 6 of the end effector 5 as a center is effected by the rotary link mechanism 12 that constitutes a pantograph mechanism (FIG. 2).

(3) Simultaneously this produces rotation about the tip 6 of the end effector 5 of the portion (FIG. 3) enclosed by the end effector 5 and the absolute coordinate system translational drive control mechanism 11.

(4) Since the horizontal state of the table 2 is maintained at all times by the orientation maintenance mechanism 18, the result is that it is possible to change the orientation of the end effector 5 approaching toward the object 3 (table 2) (FIG. 2).

(5) During the rotation at this time, the tip 6 of the end effector 5 is oriented toward the target point P (FIG. 2).

Principle and motion of 90-degree rotation:

(1) The principle is the same as that of the 45-degree rotation.

Figure 4:
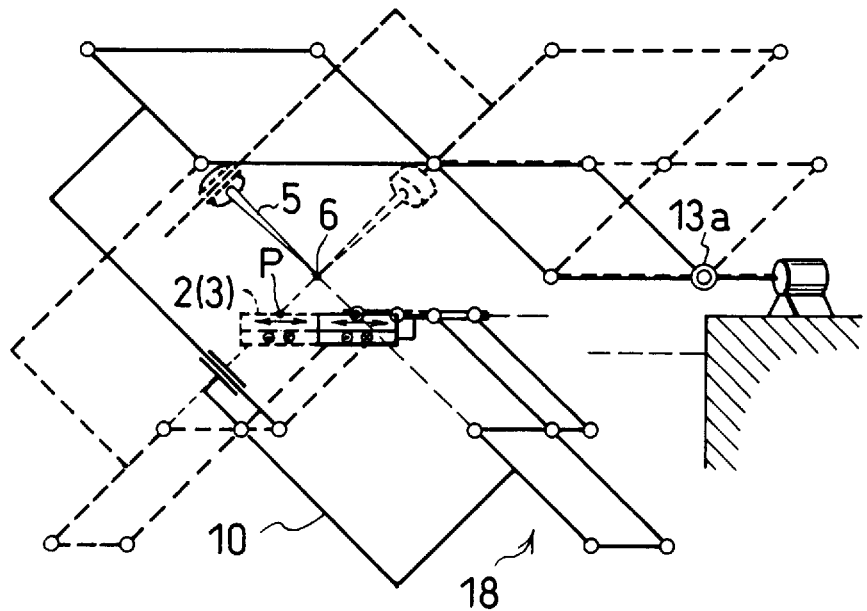
FIG. 4 is a diagram illustrating movement of the robot arm when the rotational actuator of the arm mechanism of FIG. 1 is rotated 90 degrees.
Figure 5:
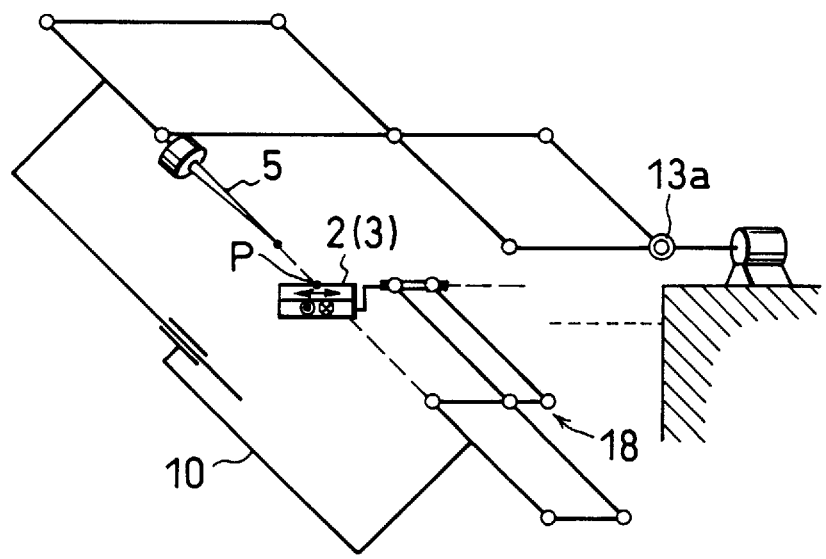
FIG. 5 a diagram showing the state of the robot arm on completion of the 90 degree rotation of the rotational actuator.

(2) Rotary actuator 13a rotates 90 degrees (FIG. 4).

(3) By means of the pantograph mechanism, the end effector 5 is rotated 90 degrees about the tip 6 as a center (FIG. 4).

(4) Simultaneously this produces rotation about the tip 6 of the end effector 5 of the portion (FIG. 5) enclosed by the end effector 5 and the end effector coordinate system translational drive control mechanism 10.

(5) Since the horizontal state of the table 2 is maintained at all times by the orientation maintenance mechanism 18, the result is that it is possible to change the orientation of the end effector 5 approaching toward the object 3 (table 2) (FIG. 4).

(6) During the rotation at this time, the tip 6 of the end effector 5 is oriented toward the target point P (FIG. 4).

Figure 6:
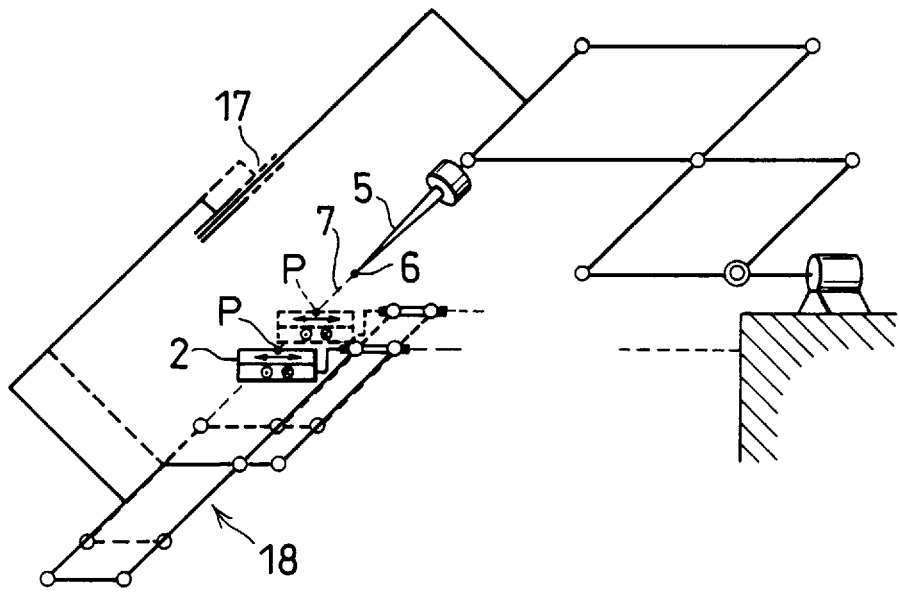
FIG. 6 a diagram illustrating movement of the table when a translational actuator of the arm mechanism of FIG. 1 is extended.

Principle and movement of translational motion along the axis of the end effector (1) The end effector coordinate system translational actuator 17 is expanded or contracted (FIG. 6).

Figure 7:
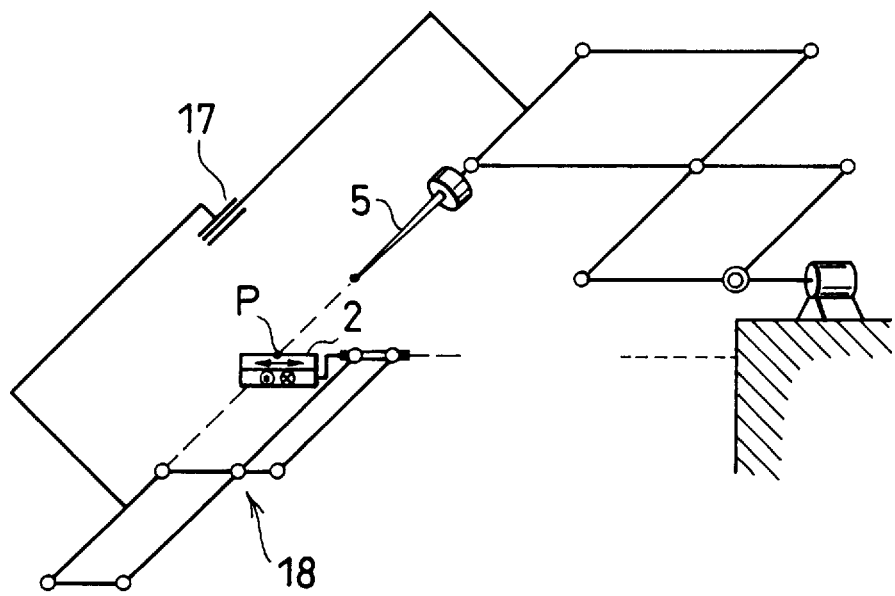
FIG. 7 is a diagram showing the state of the robot arm on completion of the extension of the translational actuator.

(2) Since the end effector coordinate system translational actuator 17 and the end effector 5 are always maintained in a parallel state, the orientation (rotation) of the end effector 5 is not affected by translational actuator motion (FIG. 7).

(3) Since the horizontal state of the table 2 is maintained at all times by the orientation maintenance mechanism 18, translational motion of the table 2 and target point P occurs relative to the tip 6 of the end effector 5 (FIG. 6).

(4) During the translational movement in the direction of the central axis 7 of the end effector 5, the tip 6 of the end effector 5 is oriented toward the target point P (FIG. 6).

Figure 8:
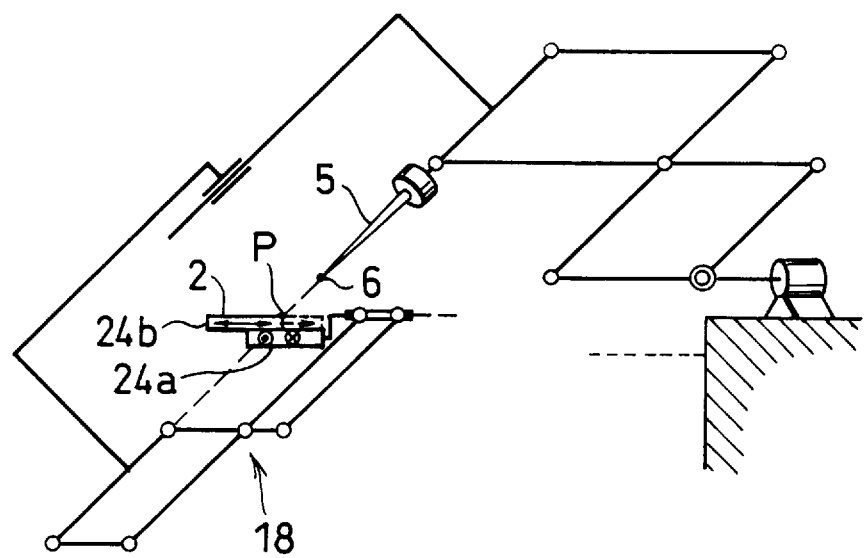
FIG. 8 is a diagram illustrating movement of the table when a translational slider of the arm mechanism of FIG. 1 is operated.

Principle and movement of translational motion in the horizontal plane of the table (1) Absolute coordinate system translational actuators 24a and 24b are movable (FIG. 8).

(2) Because the absolute coordinate system translational actuators 24a and 24b are located at the table 2, the orientation (rotation) of the end effector 5 is not affected by motion of the actuators 24a and 24b (FIG. 8).

(3) Since the horizontal state of the table 2 is maintained at all times by the orientation maintenance mechanism 18, the result is that it is possible to achieve translational motion of the table 2 in a perpendicular direction while maintaining a set angle between the table 2 and the central axis 7 of the end effector 5 (FIG. 8).

Figure 9:
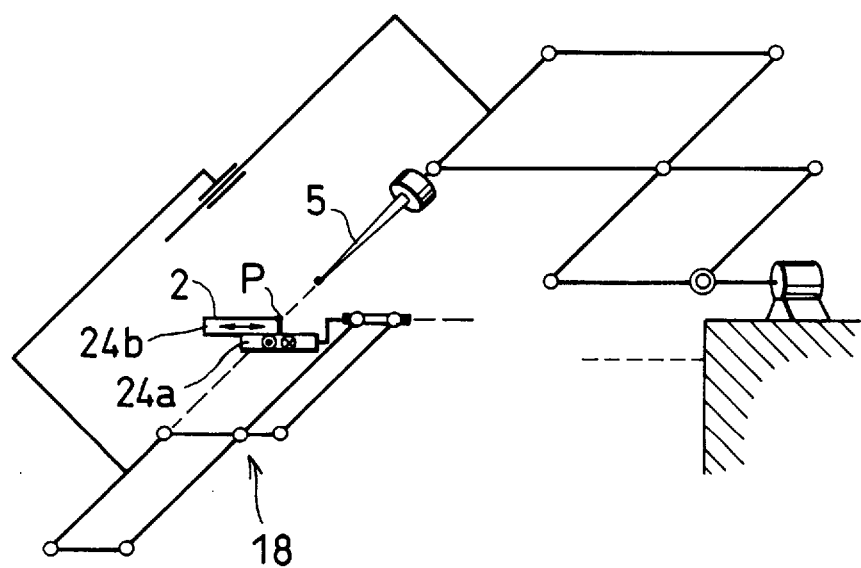
FIG. 9 is a diagram showing the state of the table on completion of the operation of the translational slider.
Figure 10:
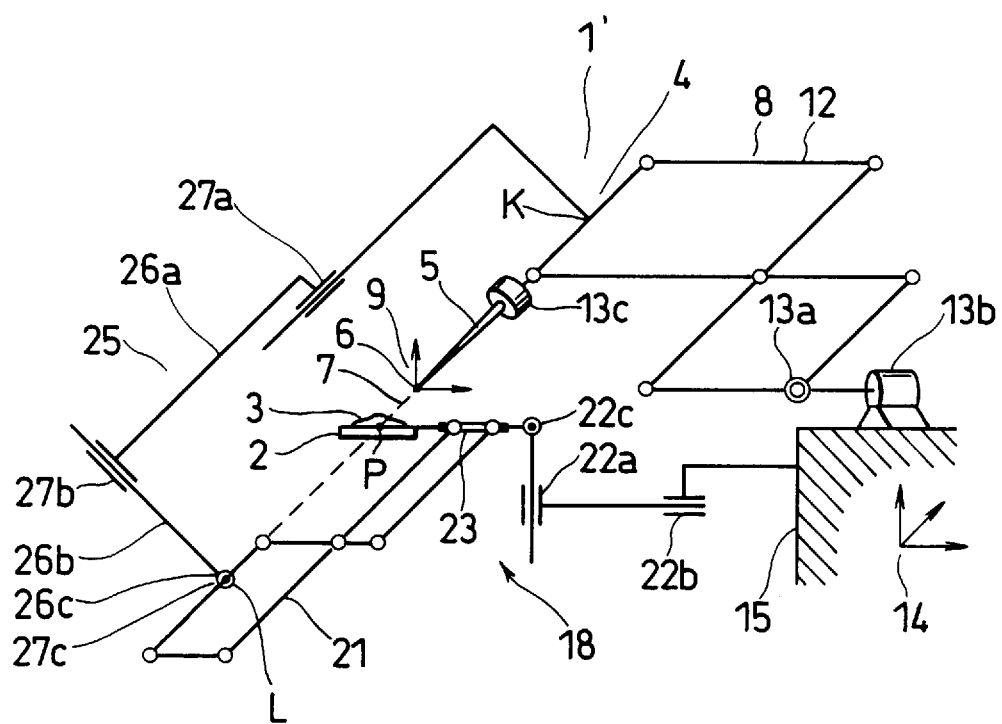
FIG. 10 is a diagram of an arm mechanism with independent control of position and orientation according to a second embodiment of the present invention.

(4) The translational motion of the table 2 that takes place at this time has the effect of changing the ultimate target task point (FIG. 9).

As described in the foregoing, with the arm mechanism according to the first embodiment, there is no interference between translational and rotational motion of the end effector, so even when the position of the end effector is changed, the tip of the end effector always points to the prescribed target point on the object.

A second embodiment of the arm mechanism with independent control of position and orientation according to the present invention will now be described, with reference to FIGS. 10 to 14.

A drive control mechanism 1' controls orientation and relative position of the tip 6 of an end effector 5 of a robot arm 4 used to perform an operation on a target object 3 on a table 2, in substantially the same way as in the first embodiment. The drive control mechanism 1' includes a rotational drive control mechanism 8 for controlling the rotational motion of the end effector 5, and a translational drive control mechanism 25 for controlling the translational motion of the object 3. The rotational drive control mechanism 8 and the translational drive control mechanism 25 are connected at point K. No relative displacement arises between point K and the origin of the end effector coordinate system.

The rotational drive control mechanism 8 is provided with rotary link mechanism 12 and rotational actuators 13a, 13b and 13c. The rotary link mechanism 12 supports the end effector 5 with respect to the base 15 fixed on the absolute coordinate system 14, and the rotational actuators 13a, 13b and 13c rotate the end effector 5 about each axis of the end effector coordinate system 9. The translational drive control mechanism 25 has orthogonal links 26a, 26b and 26c and translational actuators 27a, 27b and 27c that allow relative translational motion of the links 26a, 26b and 26c. The front end of the link 26c is connected to an orientation maintenance mechanism 18 at point L, and the front end of the orientation maintenance mechanism 18 is connected to table 2 on which a target object 3 is positioned. Thus, movement of the translational drive control mechanism 25 is transmitted to the table 2 by pantograph mechanism 21, and translational sliders 22a, 22b and 22c and rotational slider 23 support the table 2 on the fixed base 15 and maintain a fixed orientation of the target object 3 with respect to the absolute coordinate system 14. The translational sliders 22a, 22b and 22c allow translational motion along the three orthogonal axes of the absolute coordinate system 14, while the rotational slider 23 allows rotation about a horizontal coordinate axis other than the central axis 7 of the end effector coordinate system 9.

The operation of the drive control mechanism thus configured will now be described.

Arm mechanism with independent control of position and orientation (1) Rotational motion of the end effector 5 is always about the tip of the end effector as center (the center of rotation).

(2) Translational motions of the end effector 5 are based on a hand-oriented coordinate system when the center axis of the end effector 5 is one coordinate axis, and each of the translational motions is realized by motion of a single actuator.

(3) The motion of one translational actuator does not interfere with other translational or rotational motions.

(4) The motion of one rotational actuator does not interfere with other rotational or translational motions.

Mechanism for maintaining table 2 horizontal

The following sliders slide passively, that is, undriven, to maintain the horizontal state of the table 2.

(1) When the rotary actuator 13a is operated, translational slider 22a, translational slider 22b and translational slider 22c;

(2) When the rotary actuator 13b is operated, translational slider 22a, translational slider 22c and rotational slider 23;

(3) When the translational actuator 27a is operated, translational slider 22a, translational slider 22b and translational slider 22c;

(4) When the translational actuator 27b is operated, translational slider 22a, translational slider 22b and translational slider 22c; and (5) When the translational actuator 27c is operated, translational slider 22a and translational slider 22c.

Figure 11:
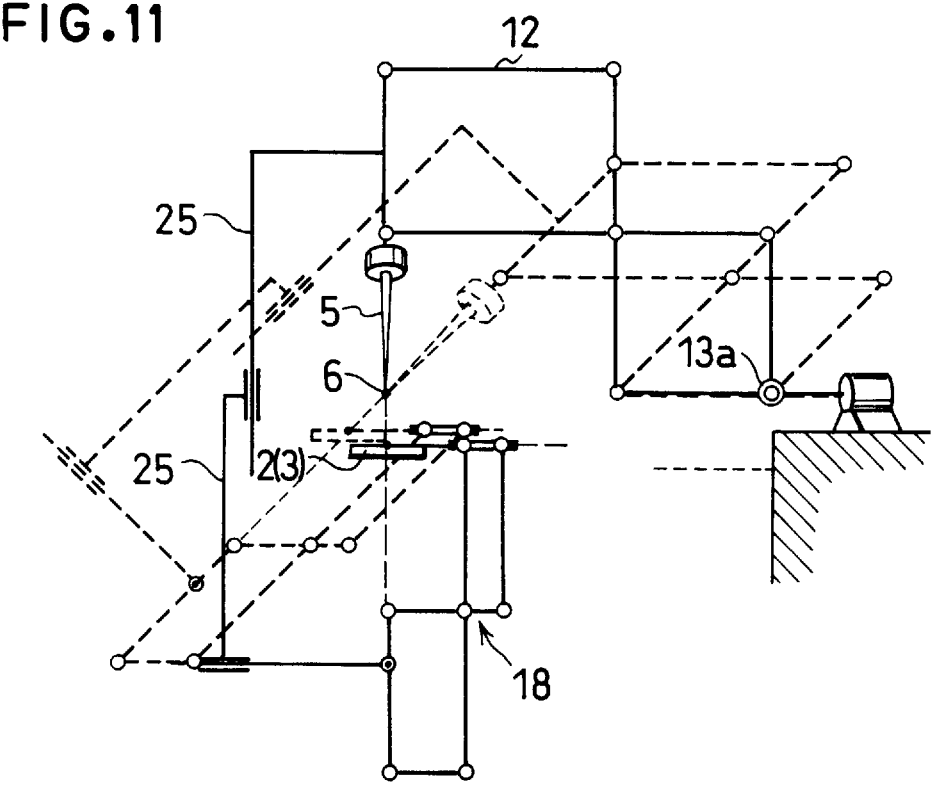
FIG. 11 is a diagram illustrating movement of a robot arm when a rotational actuator of the arm mechanism of FIG. 10 is rotated 45 degrees.

Principle and motion of 45-degree rotation (1) Rotary actuator 13a rotates 45 degrees (FIG. 11). Sliders 22a, 22b and 22c are not shown in FIGS. 11 to 14.

(2) 45-degree rotation about the tip of the end effector 5 as a center is effected by the rotary link mechanism 12 that constitutes a pantograph mechanism (FIG. 11).

(3) Simultaneously this produces rotation about the tip of the end effector 5 of the portion (FIG. 11) enclosed by the end effector 5 and the translational drive control mechanism 25.

(4) Since the horizontal state of the table 2 is maintained at all times by the orientation maintenance mechanism 18, the result is that it Is possible to change the orientation of the end effector 5 approaching toward the target object 3 (table 2) (FIG. 11).

Principle and motion of 90-degree rotation (1) The principle is the same as that of the 45-degree rotation.

Figure 12:
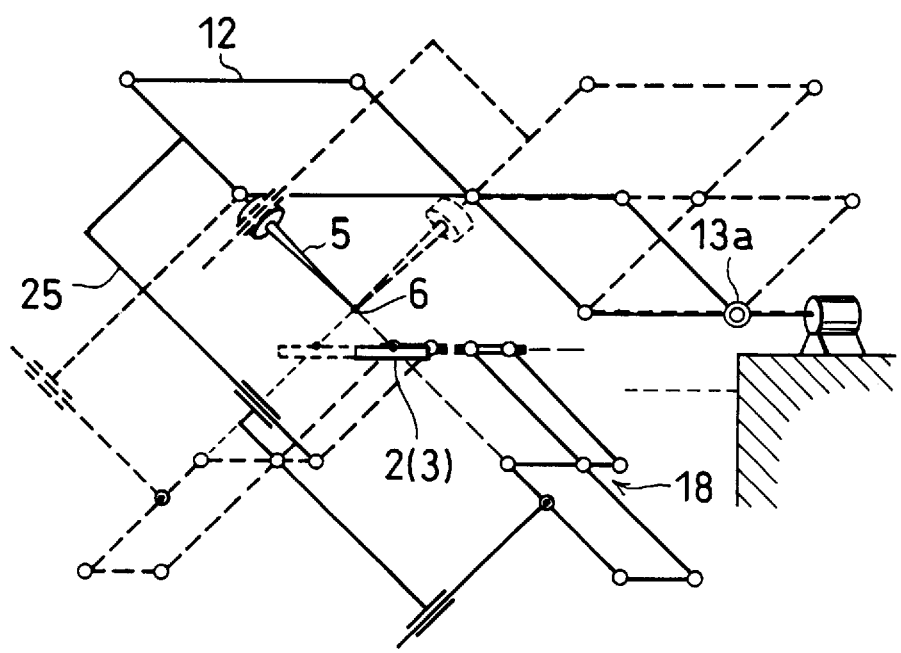
FIG. 12 is a diagram illustrating movement of the robot arm when the rotational actuator of the arm mechanism of FIG. 10 is rotated 90 degrees.

(2) Rotary actuator 13a rotates 90 degrees (FIG. 12).

(3) By means of the pantograph mechanism, the end effector 5 is rotated 90 degrees about the tip as a center (FIG. 12).

(4) Simultaneously this produces rotation about the end effector tip of the portion (FIG. 14) enclosed by the end effector 5 and the translational drive control mechanism 25.

(5) Since the horizontal state of the table 2 is maintained at all times by the orientation maintenance mechanism 18, the result is that it is possible to change the orientation of the end effector 5 approaching toward the object 3 (table 2) (FIG. 12).

Figure 13:
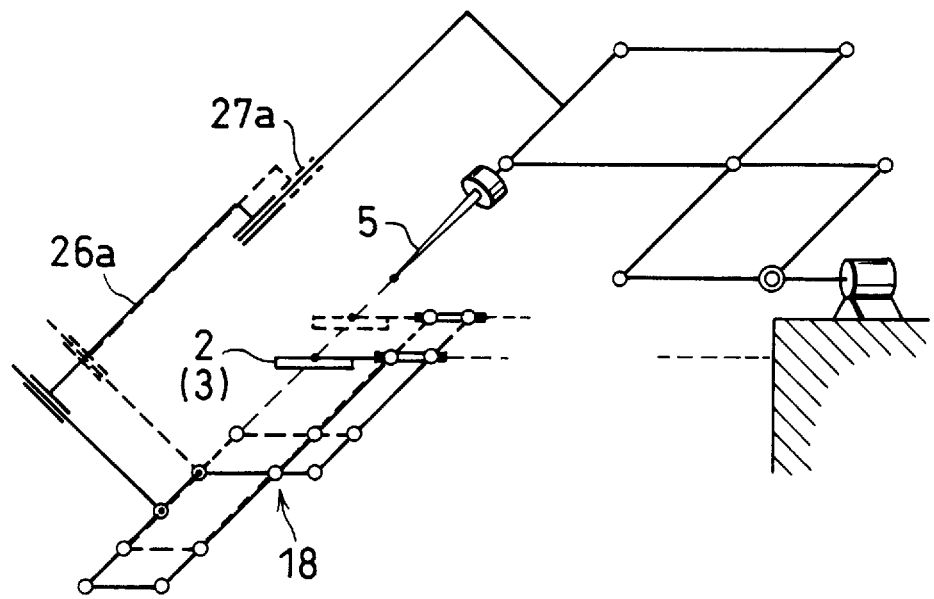
FIG. 13 a diagram illustrating movement of the table when a translational actuator of the arm mechanism of FIG. 10 is extended.

Principle and movement of translational motion along the axis of the end effector (1) The translational actuator 27a is expanded or contracted (FIG. 13).

(2) Since the translational actuator 27a and the end effector 5 are always maintained in a parallel state, the orientation (rotation) of the end effector 5 is not affected by translational actuator motion (FIG. 13).

(3) Since the horizontal state of the table 2 is maintained at all times by the orientation maintenance mechanism 18, translational motion of the object 3 (table 2) occurs relative to the tip of the end effector 5 (FIG. 13).

Figure 14:
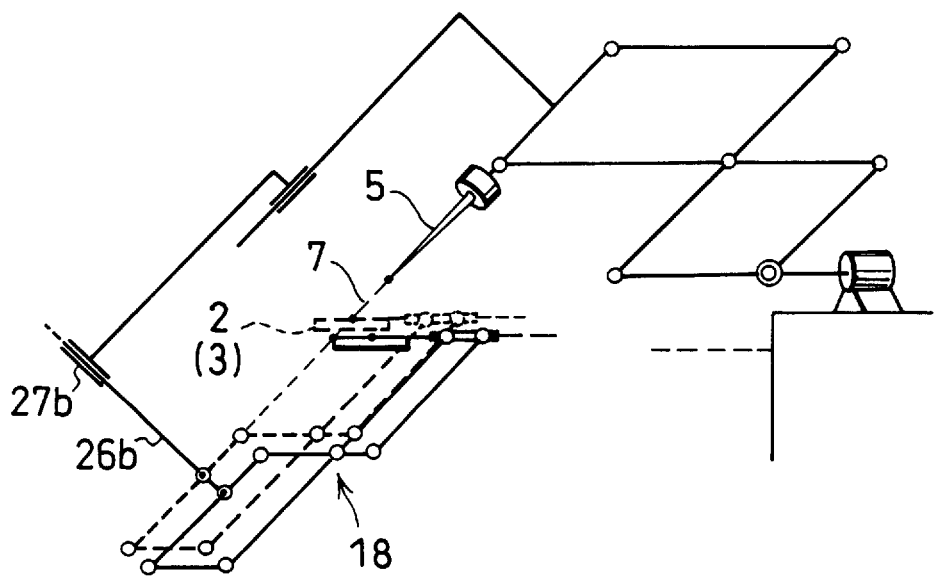
FIG. 14 s a diagram illustrating movement of the table when a translational slider of the arm mechanism of FIG. 10 is operated.

Principle and movement of translational motion perpendicular to the end effector (1) The translational actuator 27b is expanded or contracted (FIG. 14).

(2) Since the translational actuator 27b and the end effector 5 are always maintained in a parallel state, the orientation (rotation) of the end effector 5 is not affected by motion of the translational actuator 27b (FIG. 14).

(3) Since the horizontal state of the table 2 is maintained at all times by the orientation maintenance mechanism 18, translational motion of the table 2 and target task point prior to the motion takes place perpendicular to the central axis 7 of the end effector 5 (FIG. 14).

(4) The translational motion perpendicular to the end effector 5 that takes place at this time has the effect of changing the ultimate target task point (FIG. 14).

As described in the foregoing, in accordance with this invention, rotational motions for controlling the orientation of the end effector are achieved using separate rotational actuators. Also, translational motion for positioning the end effector is realized through relative displacement effected by using the separate translational actuators to drive the table. The motion of one translational actuator therefore does not interfere with other translational or rotational motions, and the motion of one rotational actuator does not interfere with other rotational or translational motions. This enables the precision of end effector tip positioning and generated force to be improved without any interference between translational and rotational motions of the end effector. With the arm mechanism of the first embodiment, the end effector can be maintained with the tip thereof pointed at a target point on a work object, resulting in improved task efficiency and accuracy. Also, the arm mechanism according to the second embodiment has an end effector coordinate system the origin of which is a point on the end effector, making it easier for an operator to ascertain the position and/or orientation of the end effector, which also enables task efficiency and accuracy to be improved.

What is claimed is:

1. An arm mechanism with independent control of position and orientation, comprising a drive control mechanism for controlling orientation and relative position of an end effector of a robot arm to perform an operation on a target object, said drive control mechanism having an absolute coordinate system and an end effector coordinate system that locates an origin thereof at a point on the end effector, and including an end effector drive control mechanism that supports the end effector and controls orientation and relative position of the end effector on the end effector coordinate system, said end effector drive control mechanism including a rotational drive control mechanism that controls rotational motion of the end effector and an end effector coordinate system translational drive control mechanism that controls translational motion of the target object and is connected with the rotational drive control mechanism, said rotational drive control mechanism including three rotational actuators for rotating the end effector about each axis of the end effector coordinate system, said end effector coordinate system translational drive control mechanism including an end effector coordinate system translational actuator that effects translational motion of the target object along an end effector center axis direction of the end effector coordinate system, said drive control mechanism further including an orientation maintenance mechanism that is connected to the end effector coordinate system translational drive control mechanism and maintains a fixed orientation of the target object on the absolute coordinate system and two absolute coordinate system translational actuators supported on the orientation maintenance mechanism, said absolute coordinate system translational actuators effecting translational motion of the target object along two orthogonal axes on the absolute coordinate system.

2. An arm mechanism according to claim 1, wherein one coordinate axis of the end effector coordinate system coincides with the end effector center axis.

3. An arm mechanism according to claim 1, further comprising three translational sliders, one rotational slider and a table, said orientation maintenance mechanism supports the target object on the table via the three translational sliders and the one rotational slider.

4. An arm mechanism with independent control of position and orientation, comprising a drive control mechanism for controlling orientation and relative position of an end effector of a robot arm to perform an operation on a target object, said drive control mechanism having an absolute coordinate system and an end effector coordinate system that locates an origin thereof at a point on the end effector, and including an end effector drive control mechanism that supports the end effector and controls orientation and relative position of the end effector on the end effector coordinate system, said end effector drive control mechanism including a rotational drive control mechanism that controls rotational motion of the end effector and a translational drive control mechanism that controls translational motion of the target object and is connected with the rotational drive control mechanism, said rotational drive control mechanism including three rotational actuators for rotating the end effector about each axis of the end effector coordinate system, said translational drive control mechanism including three translational actuators that effect translational motion of the target object along each axis of the end effector coordinate system, said drive control mechanism further including an orientation maintenance mechanism that is connected to the translational drive control mechanism and maintains a fixed orientation of the target object on the absolute coordinate system.

5. An arm mechanism according to claim 4, wherein one coordinate axis of the end effector coordinate system coincides with the end effector center axis.

6. An arm mechanism according to claim 4, further comprising three translational sliders, one rotational slider and a table, said orientation maintenance mechanism supports the target object on the table via the three translational sliders and the one rotational slider.

* * * * *